UNITED STATES PATENT OFFICE.

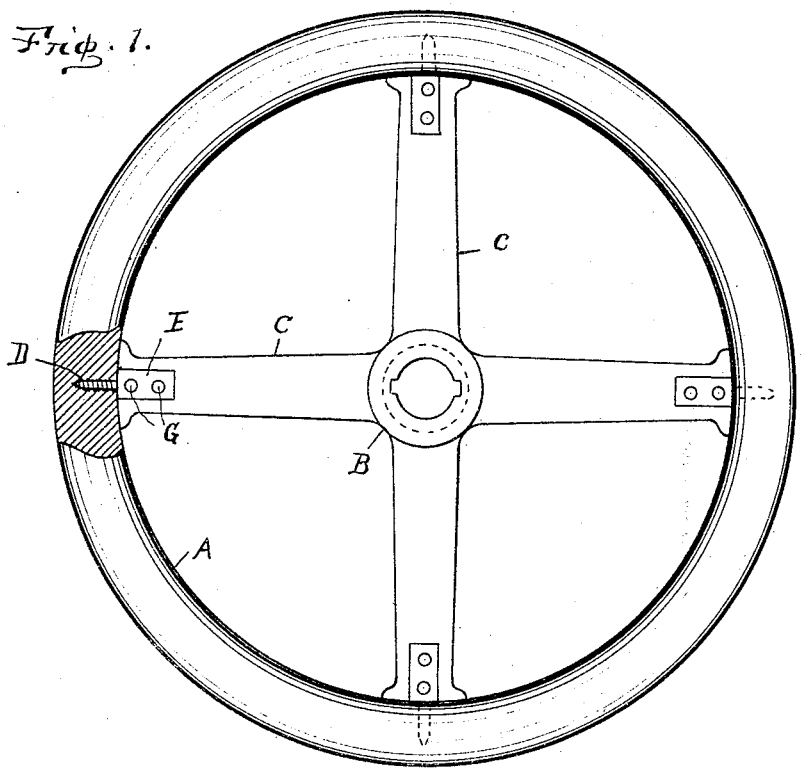
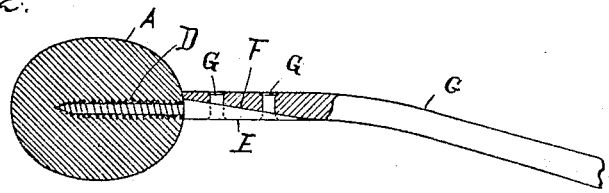

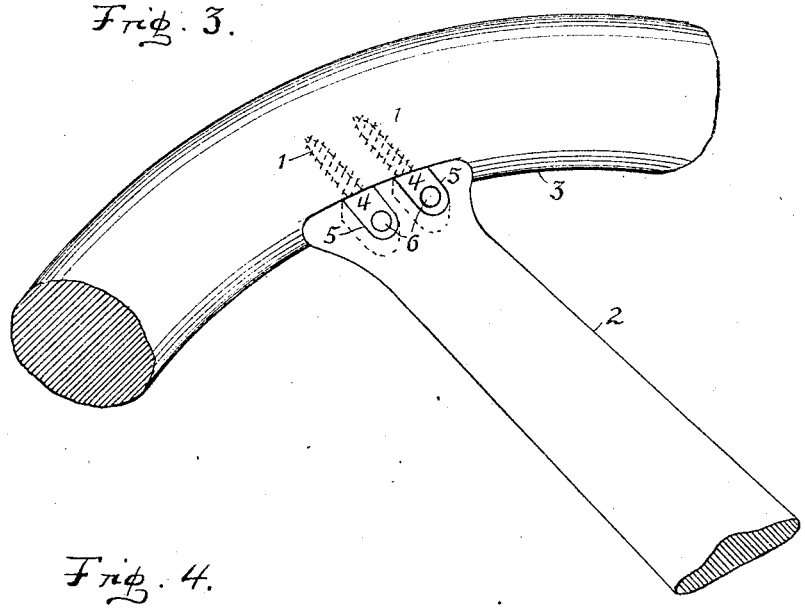
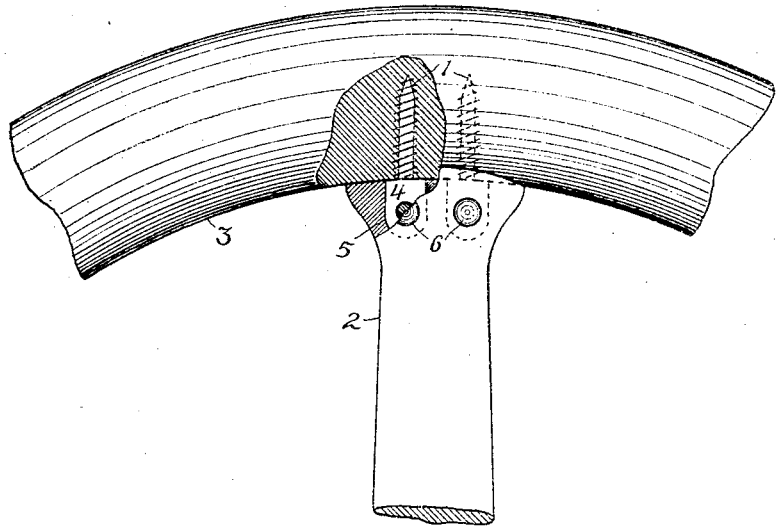

CYRUS I. FLACK, OF FORT WAYNE, INDIANA.

STEERING-WHEEL.

1,364,740. Specification of Letters Patent. Patented Jan. 4, 1921.

Application filed October 24, 1919. Serial No. 332,941.

*To all whom it may concern:*

Be it known that I, CYRUS I. FLACK, a citizen of the United States of America, and resident of Fort Wayne, in the county of Allen and State of Indiana, have invented certain new and useful Improvements in Steering-Wheels, of which the following is a specification.

This invention relates to improvements in steering wheels of that class used on automobiles, and the object thereof is to provide means for the attachment of the ends of the arms of a metallic spider to a wooden rim that will insure permanent and rigid connection between the spider and rim without weakening the rim by forming gains therein.

The object of the invention is accomplished by the construction illustrated in the accompanying drawings in which:—

Figure 1 is a bottom plan of a steering wheel partly broken away and in section showing the invention;

Fig. 2 is a detail view showing a cross-section of the rim and a portion of one of the arms broken away and in section showing the method of securing the arm to the rim;

Fig. 3 is a detail view in perspective showing a modification of the invention as it appears inverted; and Fig. 4 is a detail view showing a top plan of Fig. 3, a portion thereof being cut away and in section.

Similar characters of reference indicate corresponding parts throughout the several views, and referring now to the same:

A is a wooden rim, and B is a metallic spider having radial arms C, the outer ends of which fit within the rim against the inner perimeter thereof respectively.

A number of screws D are driven into the rim from the inner perimeter thereof with their heads E extending diametrically inward toward the axial center of the wheel. The heads E are wedge-shaped and each fits within a recess F made in the end of the corresponding arm C of the spider and is securely fastened therein by means of rivets F that pass through the head and arm. When thus secured to the arm the screws are thereby prevented from turning so as to become loose, and the arms are therefore held in fixed and permanent connection with the rim.

In the modified form shown in Figs. 3 and 4, a pair of screws 1 are used to secure each spider arm 2 to the rim 3, the heads 4 of the screws being shaped to fit in corresponding recesses 5 in the arm. Rivets 6 extend through the screw heads and arm so that the screws are prevented from turning in the rim.

In attaching the spider to the wheel, the screws are first driven tightly into the rim to their permanent positions and the arms are then fitted to the respective heads and secured thereto by the rivets.

What I claim is:—

1. In a steering wheel, a rim; a spider having arms, the outer ends of which fit within the inner perimeter of the rim, each arm having a recess in its underside at the outer end thereof; and a series of screws extending into the rim, each having a wedge-shaped head that extends diametrically inward toward the axis of the wheel and being secured in the recess of the corresponding arm.

2. In a steering wheel, a rim; a spider having arms the outer ends of which fit against the rim; and screws extending into the rim and permanently secured to the respective arms in a manner to prevent them from turning in the rim.

In testimony whereof I affix my signature, in presence of two witnesses.

CYRUS I. FLACK.

Witnesses:
KATHRYN SCHERZINGER,
WALTER G. BURNS.